United States Patent
Martin de Nicolas et al.

(10) Patent No.: US 8,208,367 B2
(45) Date of Patent: Jun. 26, 2012

(54) METHOD FOR PROVIDING DUMPS IN A DISTRIBUTED ENVIRONMENT OF A TELECOMMUNICATION NETWORK

(75) Inventors: Arturo Martin de Nicolas, Aachen (DE); Thomas Korst, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 119 days.

(21) Appl. No.: 12/279,090

(22) PCT Filed: Feb. 14, 2006

(86) PCT No.: PCT/EP2006/001314
§ 371 (c)(1),
(2), (4) Date: Aug. 12, 2008

(87) PCT Pub. No.: WO2007/093188
PCT Pub. Date: Aug. 23, 2007

(65) Prior Publication Data
US 2009/0010151 A1    Jan. 8, 2009

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04M 1/24 | (2006.01) |
| H04M 3/08 | (2006.01) |
| H04M 3/22 | (2006.01) |
| H04M 15/00 | (2006.01) |
| H04M 7/00 | (2006.01) |

(52) U.S. Cl. ........................................................ 370/216

(58) Field of Classification Search .................. None
See application file for complete search history.

(56) References Cited

U.S. PATENT DOCUMENTS

| | | | | |
|---|---|---|---|---|
| 6,956,856 | B2* | 10/2005 | Sanchez et al. | 370/395.2 |
| 2003/0169729 | A1* | 9/2003 | Bienn et al. | 370/353 |
| 2004/0121775 | A1* | 6/2004 | Ropolyi et al. | 455/445 |
| 2005/0276385 | A1* | 12/2005 | McCormick et al. | 379/1.02 |
| 2006/0268845 | A1* | 11/2006 | He et al. | 370/352 |
| 2007/0165598 | A1* | 7/2007 | Hynonen et al. | 370/352 |

FOREIGN PATENT DOCUMENTS
EP    1 603 272 A    12/2005

OTHER PUBLICATIONS

Taylor, T.; "Megaco/H.248: a new standard for media gateway control" Published by: Communications Magazine, IEEE Publication Date: Oct. 2000 vol. 38, Issue:10 on pp. 124-132.*

* cited by examiner

Primary Examiner — Xavier Szewai Wong

(57) ABSTRACT

The invention proposes a method for providing dumps. The method is performed in a first functional entity of a distributed environment of a telecommunication network. The first functional entity may communicate with a second functional entity. During a call set-up procedure typically a unique identification is exchanged between the first and the second functional entity. When an error is detected, information related to the call is dumped and the unique identifier is associated thereto. Furthermore, a message is generated which comprises a signal descriptor indicating that the message is generated in response to a detected error. Subsequently, the generated message is send to the second functional entity to provoke a dump of information related to the call and associating the unique identification. Furthermore, alternative embodiments and devices adapted for the methods are disclosed.

20 Claims, 4 Drawing Sheets

METHOD FOR PROVIDING DUMPS IN A DISTRIBUTED ENVIRONMENT OF A TELECOMMUNICATION NETWORK

TECHNICAL FIELD

The present invention relates to a method for and to respective devices allowing for providing dumps in a distributed environment of a telecommunication network. Intelligent Networks and layered architecture are examples of such a distributed environment of a telecommunication network.

BACKGROUND

In Layered Architecture as an example of a distributed environment, a Media Gateway Controller (MGC) typically uses a Gateway Control Protocol (GCP, H.248, Megaco) to control the set-up and release of bearers and the use of resources within the Media Gateway (MGW) to handle the user plane. Resources within the Media gateway may comprise echo cancellers, tone senders, tone receivers, transcoders, announcement machines, etc.

For the purpose outlined above, the MGC may use a set of call related commands, such as ADD, MOV, MOD, SUB to create, move, modify or remove a termination or a Notify command to inform the Media Gateway Controller MGC of an event detected by the Media Gateway MGW, e.g. a bearer has been established towards a peer MGW.

Furthermore, the MGC may use non-call related commands. These commands comprise a Service_Change, Audit_Value or Audit_Capabilities command.

Hence, in Layered Architecture the MGW is context and termination oriented whereas the MGC is call oriented.

In general terms, the Media Gateway Controller is part of the call control plane typically handling the call control protocols such as BICC, ISUP, RANAP, BSSAP, . . . whereas the Media Gateway is part of the user plane typically handling bearer control protocols such as Nb framing, RTP, IP, Q.AAL2, AAL2, . . . .

Although such a layered architecture provides numerous advantages, it is also a consequence that it becomes more difficult to trace calls and/or to debug problems once they occur in the layered architecture than it is in a traditional non-layered architecture.

When a problem occurs in layered architecture typically only a partial view of the history of events that might have lead to the problem is available to operators, maintenance personnel or trouble shooters.

The following two examples illustrate two exemplary scenarios.

Scenario I, a Fault Occurs within the Call Control Plane.

Assume a problem have been detected within a Media Gateway Controller (MGC). This problem typically leads to a release of the call by the Media Gateway Controller. At that stage the Media Gateway Controller will typically perform two actions:

- Clear the call, i.e. all resources used by the call will be released, so that they become available for other calls. Such a clearing includes also resources used in the Media Gateway, i.e. SUB commands will be sent to all terminations involved in the Media Gateway.
- Dump data available within the Media Gateway Controller so that it can be used for debugging purposes.

However, the Media Gateway not having the call control plane view is not able to differentiate these SUB commands issued to an abnormal release from a SUB corresponding to a normal call release.

Hence, the Media Gateway is not aware that a problem related to this context and termination has occurred and consequently the MGW will typically erase any information that it might have kept during the existence of the context.

As a consequence, the Media Gateway will not be able to provide any information (logs, dumps) that would help to debug a problem that occurred or was detected in the Media Gateway Controller.

Scenario II, a Fault Occurs within the User Plane

Assume a problem have been detected within a Media Gateway. A consequence might be that the Media Gateway will not be able to execute certain subsequent commands. For example, the Media Gateway receives a MOD command. If the MOD command could not be executed an error message is replied to the Media Gateway Controller. Subsequently, the Media Gateway Controller typically releases the call.

Since, the call release is effected by an external reason, the MGC may consider that it doesn't need to dump any information that it might have kept during the existence of the call, but simply proceed with a normal release sequence.

As a consequence, the Media Gateway Controller will not be able to provide any information (logs, dumps) that would help to debug a problem that occurred or was detected in the MGW.

Furthermore, other contexts in the same or in another MGW as it might happen for example within a conference call may be also related to the call. Those contexts will naturally be removed when the call is cleared.

Hence, also the same or another Media Gateway related to the call will not be able to provide any information (logs, dumps) that would help to debug a problem that occurred or was detected in the Media Gateway.

SUMMARY

It is the object of the invention to obviate at least some of the above disadvantages and provide an improved method for providing dumps in a distributed environment of a telecommunication network.

According to the invention, the method described in claim 1 or claim 8 is performed. Furthermore, the invention is embodied in devices as described in claims 15 and 18. Advantageous embodiments are described in the dependent claims.

The proposed method for providing dumps is performed in a first functional entity of a distributed environment of a telecommunication network. The first functional entity may communicate with one or more second functional entity. During a call set-up procedure a unique identification is exchanged between the first and the one or more second functional entities. When an error is detected, information related to the call is dumped and the unique identifier is associated thereto. Furthermore, a message is generated which comprises a signal descriptor indicating that the message is generated in response to a detected error. Subsequently, the generated message is send to the one or more second functional entities to provoke a dump of information related to the call and associating the unique identification.

In an embodiment of the method, the first and second functional entities communicate according to a Megaco, GCP or H.248 protocol.

In a further embodiment of the method, the unique identification is exchanged in an ADD command.

In a further embodiment of the method, the message comprising a signal descriptor is a SUB command.

For the above described methods, the first functional entity is preferably a Media Gateway Controller and the second functional entities is a Media Gateway.

In an alternative embodiment of the method, the first and second functional entities communicate according to an INAP or Camel Application Part protocol.

For the above described methods of the alternative embodiment of the method, the first functional entity is preferably a service switching function and the second functional entity is preferably a service control function.

The proposed method for providing dumps may also be performed in a second functional entity of a distributed environment of a telecommunication network. The second functional entity may communicate with a first functional entity. During a call set-up procedure a unique identification is exchanged between the first and the second functional entity. The second functional entity receives an event descriptor having an assigned event to be reported when an error occurs. When an error is detected, information related to the call is dumped and the unique identifier is associated thereto.

Furthermore, a message is generated which comprises the assigned event according to the event descriptor indicating that the message is generated in response to a detected error. Subsequently, the generated message is send to the first functional entity to provoke a dump of information related to the call and associating the unique identification.

In an embodiment of the other proposed method, the first and second functional entities communicate according to a Megaco, GCP or H.248 protocol.

In an embodiment of the other proposed method, the unique identification is exchanged in an ADD command.

In an embodiment of the other proposed method, the message comprising the assigned event is a NOTIFY command.

For the above described methods of the other proposed method, the second functional entity is preferable a Media Gateway and the first functional entity is preferably a Media Gateway Controller.

In an alternative embodiment of the other proposed method, the first and second functional entities communicate according to an INAP or Camel Application Part protocol.

For the above described alternative embodiment of the other proposed method, the second functional entity is preferably a service switching function and the first functional entity is preferably a service control function.

In addition a First Device of a distributed environment of a telecommunication network providing dumps is proposed. The first device comprises Communication means adapted to exchange messages between the first device and a second device. Furthermore, the first device comprises Means for detecting an error. Additionally, the first device also comprises Means for dumping information related to the call and means for associating the unique identification (ID) thereto. Still further, the first device comprises Means for generating a message comprising a signal descriptor indicating that the message is generated in response to a detected error.

For the above described embodiment, the First Device is preferably a Media Gateway Controller or alternatively the First Device is a service switching point (SSP).

Furthermore, a Second Device of a distributed environment of a telecommunication network providing dumps is proposed. The second device comprises Communication means adapted to exchange messages between the second device and a first device. Furthermore, the second device comprises Means for detecting an error. Additionally, the second device also comprises Means for dumping information related to the call and means for associating the unique identification thereto. Still further, the second device comprises Means for generating a message comprising the assigned event according to the event descriptor indicating that the message is generated in response to a detected error.

For the above described other embodiment, the Second Device is preferably a Media Gateway (MGW or alternatively the Second Device is a service control point (SCP).

BRIEF DESCRIPTION OF THE DRAWINGS

By means of the appended figures the invention will now be described in detail.

In the following.

DETAILED DESCRIPTION

Figure 1:
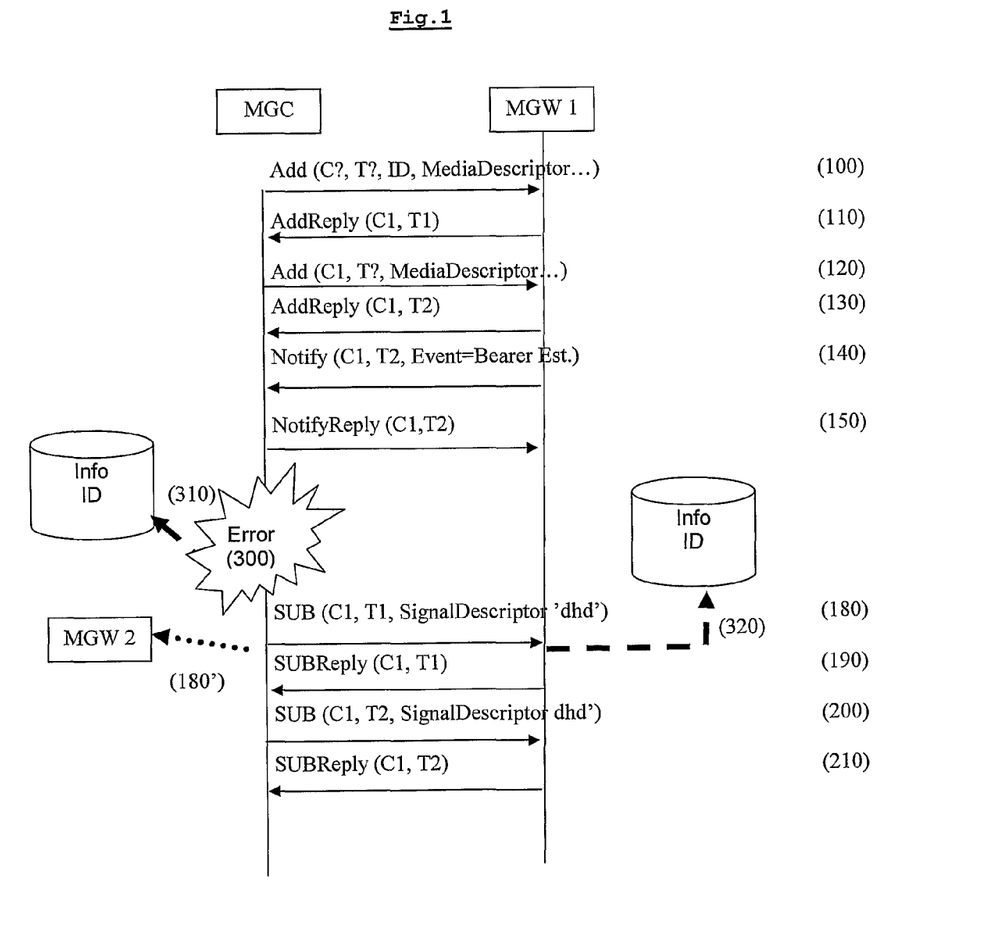
FIG. 1 shows a signaling diagram according to the invention when an error occurs within a first functional entity.
Figure 4:
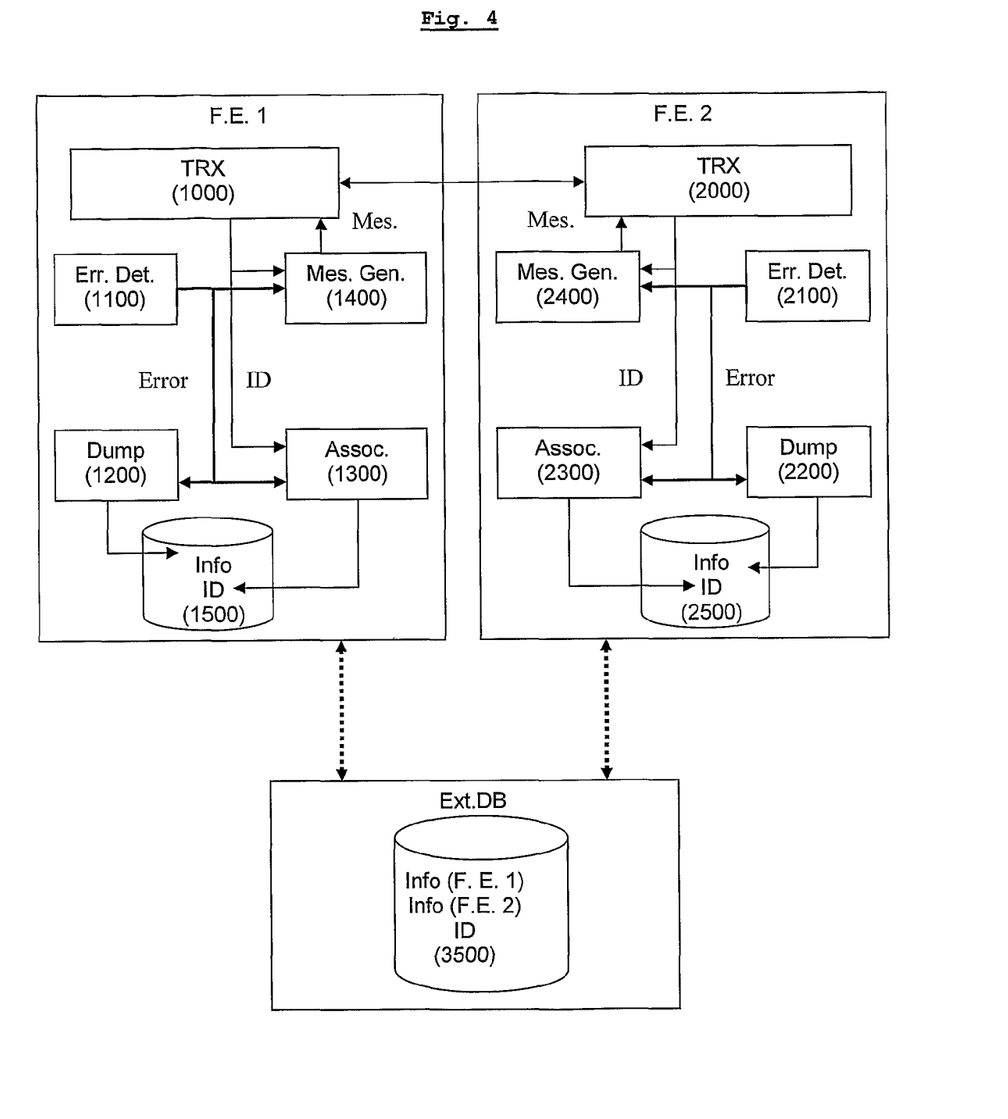
FIG. 4 shows a schematic view of devices according to the invention.

FIG. 1 shows a signaling diagram according to the invention. In the following it is assumed that a Media Gateway Controller (MGC) represents a first functional entity whereas a Media Gateway (MGW 1; MGW 2) represents a second functional entity. The Media Gateway Controller (MGC) as well as the Media Gateway (MGW 1, MGW 2) offers certain functionality which is depicted in FIG. 4.

In specific, the Media Gateway Controller (F.E.1) and the Media Gateway (F.E.2) are equipped with Communication means (1000, 2000) such as a transmitter and a receiver. By means of these communication means and a certain protocol such as Megaco, GCP or H.248 the Media Gateway Controller and the Media Gateway exchange messages.

As shown in FIG. 1, a call will be setup by means of an Add command which is send to the Media Gateway having certain parameters as shown in step 100. Such parameters may comprise a unique identification (ID), a media descriptor, an event descriptor, a signal descriptor, a context number, a termination number, a topology descriptor. Not all of these parameters are shown.

The Add command relating to a call set-up procedure may comprise neither a context number nor a termination number.

The Media Gateway (MGW 1) may reply in step 110 to the command with an AddReply having a context number and a termination as parameter.

The Media Gateway Controller (MGC) now sends is step 120 another Add command for the context identified by the received context number in order to add another termination to the context.

The Media Gateway (MGW) will reply in step 130 to the command with an AddReply having at least the context number and another termination as parameter.

After that the Media Gateway (MGW 1) may issue in step 140 a Notify Message indicating an event, i.e. that a bearer is established.

The Media Gateway Controller (MGC) will than reply to the Notify in step 150 with a NotifyReply message.

If now an error 300 occurs within the Media Gateway Controller (MGC), the media gateway controller will detect the error by some error detection means (1100). Such error detection means may be implemented within a processor offering such functionality or which is suitably programmed.

The Media Gateway Controller (MGC) will proceed with the following steps which may be performed in parallel or sequentially.

In a step 310 following the error 300, information (info) related to the call such as history information and/or logs concerning the call are dumped and the unique identification (ID) is associated to the dump. The dump and the associated unique identification (ID) may be stored locally or remote, for that the information of the Media Gateway Controller (MGC) is available to operators, maintenance personnel or trouble shooters.

Furthermore, in step 180 following the error 300, a SUB command is send To the Media Gateway (MGW 1) having parameters relating to the call. Such parameters comprise the context number and a termination of the context, as well as a SignalDescriptor ('dhd').

The signal descriptor ('dhd') indicates that the SUB command is not related to a normal release of a call but to a detected error.

In doing so, the Media Gateway (MGW 1) now is provoked to also dump the information such as such as history information and/or logs related to the call, i.e. the context view thereof, and to associate the unique identification exchanged during call-setup. The dump and the associated unique identification (ID) may be stored locally or remote, for that the information of the Media Gateway (MGW 1) is available to operators, maintenance personnel or trouble shooters.

The Media Gateway (MGW 1) in step 190 replies to the SUB command and the Media Gateway Controller in step 200 sends another SUB command relating to the same context but to a different termination.

This sub command may also comprise the Signal Descriptor as described in step 180. However, it is not necessary since the information relating to the context is already dumped.

The Media Gateway (MGW 1) in step 210 replies to the SUB command and the call release according to the example is completed.

Hence, the information related to the call available in the Media Gateway will not be lost as experienced previously, but all information relating to the call of both entities involved in a call is now available to operators, maintenance personnel or trouble shooters. Since the information has a unique identification (ID), the information may be easily analyzed.

Furthermore, other contexts in the same or in another Media Gateway (MGW 2) as it might happen for example within a conference call may be also related to the call.

In order to inform these other Media Gateway (MGW 2) accordingly, the Media Gateway Controller (MGC) may also issue in step 180 a corresponding message such as described in step 180 provoking a dump of information.

Hence, also the same or another Media Gateway (MGW 2) related to the call is now provoked to dump the information such as history information and/or logs related to the call, i.e. the context view thereof, and to associate the unique identification exchanged during call-setup. The dump and the associated unique identification (ID) may be stored locally or remote, for that the information of the Media Gateway (MGW 2) is available to operators, maintenance personnel or trouble shooters.

Furthermore, it would also be possible to store the dumps in a common database (3500) having the unique identifier (ID) as a common key.

Figure 2:
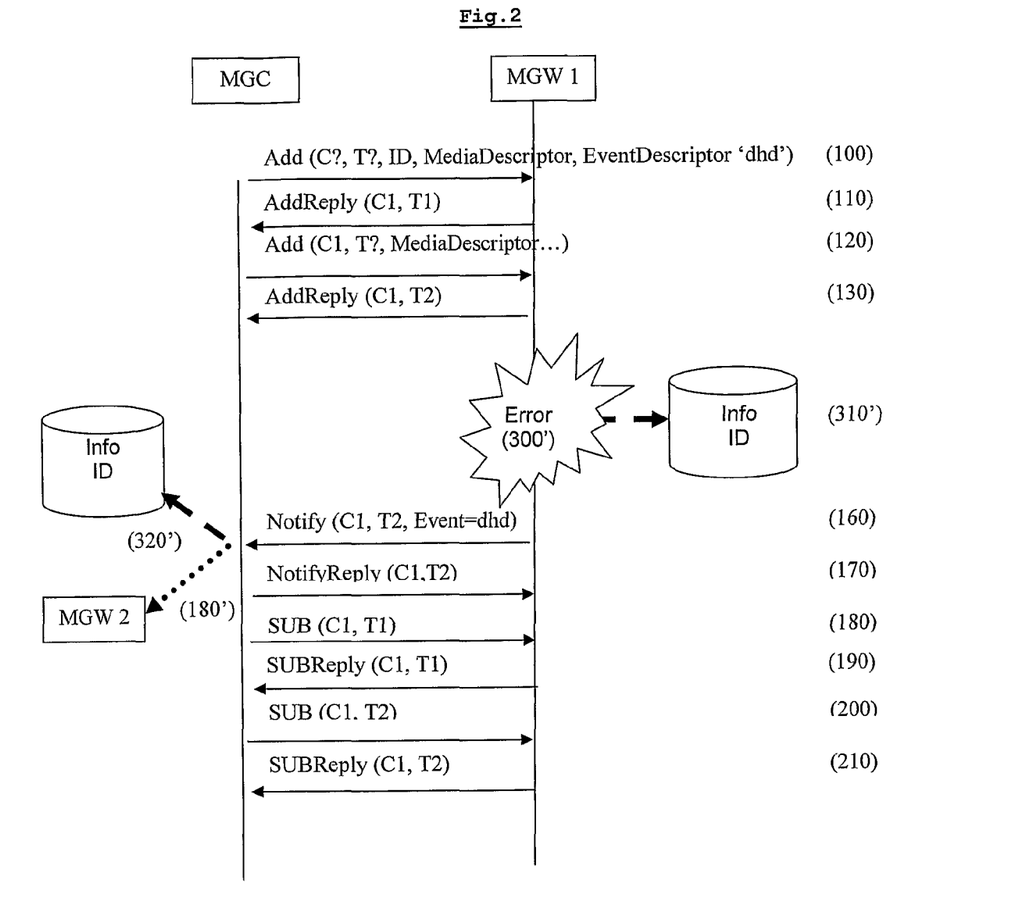
FIG. 2 shows a signaling diagram according to the invention when an error occurs within a second functional entity.

FIG. 2 shows a signaling diagram according to the invention. In the following it is assumed that a Media Gateway Controller (MGC) represents a first functional entity whereas a Media Gateway (MGW 1) represents a second functional entity. The Media Gateway Controller (MGC) as well as the Media Gateway (MGW 1) offers certain functionality which is depicted in FIG. 4 and described above.

As discussed with respect to FIG. 1, a call is set-up. Since the procedure would be the same only some differences are mentioned.

However, the Add command sent by the Media Gateway now also comprises a parameter EventDescriptor 'dhd'. This parameter could have been present in the above described example as well.

By providing this parameter, the second functional entity is made aware that it should issue a notification message once the event occurs. As in the above example a unique identification (ID) is exchanged.

If now an error 300' occurs within the Media Gateway (MGW 1), the media gateway will detect the error by some error detection means (2100). Such error detection means may be implemented within a processor offering such functionality or which is suitably programmed.

The Media Gateway (MGW 1) will proceed with the following steps which may be performed in parallel or sequentially.

In a step 310' following the error 300', information (info) related to the call such as history information and/or logs concerning the call, i.e. the context view thereof, are dumped and the unique identification (ID) is associated to the dump. The dump and the associated unique identification (ID) may be stored locally or remote, for that the information of the Media Gateway (MGW 1) is available to operators, maintenance personnel or trouble shooters.

Furthermore, in step 160 following the error 300', a Notify message is send to the Media Gateway Controller (MGC) having parameters relating to the call. Such parameters comprise the context number and a termination of the context, as well as the Event Descriptor ('dhd').

The event descriptor ('dhd') indicates that the Notify message is not related to a normal condition but to a detected error.

In doing so, the Media Gateway Controller (MGC) now is provoked to also dump in step 320' the information such as such as history information and/or logs related to the call, i.e. the context view thereof, and to associate the unique identification exchanged during call-setup. The dump and the associated unique identification (ID) may be stored locally or remote, for that the information of the Media Gateway Controller (MGC) is available to operators, maintenance personnel or trouble shooters.

In order to complete the call release, the Media Gateway Controller (MGC) replies in step 170 to the notification. Subsequently, the Media Gateway (MGC) performs the call release procedure as outlined above. Although in FIG. 2 in step 180 the SUB command does not show a Signal Descriptor as in FIG. 1, such a Signal Descriptor still may be present.

However, it would not provide any further information.

Hence, the information related to the call available in the Media Gateway Controller will not be lost as experienced previously, but all information relating to the call of both entities involved in a call is now available to operators, maintenance personnel or trouble shooters. Since the information has a unique identification (ID), the information may be easily analyzed.

Furthermore, other contexts in the same or in another Media Gateway (MGW 2) as it might happen for example within a conference call may be also related to the call.

In order to inform these other Media Gateway (MGW 2) accordingly, the Media Gateway Controller (MGC) may also issue in step 180' a corresponding message such as described in step 180 provoking a dump of information.

Hence, also the same or another Media Gateway (MGW 2) related to the call is now provoked to dump the information such as such as history information and/or logs related to the call, i.e. the context view thereof, and to associate the unique identification exchanged during call-setup. The dump and the associated unique identification (ID) may be stored locally or remote, for that the information of the Media Gateway (MGW 2) is available to operators, maintenance personnel or trouble shooters.

Furthermore, it would also be possible to store the dumps in a common database (3500) having the unique identifier (ID) as a common key.

In order to perform the above described methods, the functional entities provide Error Detection Means (1100, 2100), a Message Generator (1400, 2400) and Means allowing to dump info (1200, 2200) and associate (1300, 2300) the unique identification thereto. Since these means operate jointly they could also be integrated into a single means such as a microprocessor or microcontroller.

Such methods may be easily implemented since the protocols as outlined above define ellipsis within the herein described commands. For example, the H.248.1 standard currently doesn't contain a Signal descriptor in the Subtract command. However, the standard allows for additions, since it contains ellipsis. Hence, the invention may be embodied without violating the standard.

However, such a Signal descriptor could be sent in any command following the error. Hence, it could also be sent in a MOD command, for example, to release the bearer, prior to deleting the termination, or a MOV command, for example to place the trouble termination first in a separate context. In addition, it would also possible to send it within a Service-Change with a new ServiceChangeMethod.

In the same manner, such an Event Descriptor could be sent in any command following the error.

Furthermore, the unique identification (ID) is exchanged right at the first messages in the call attempt; hence it is not bound to the indication of abnormal release.

As will also be appreciated, it is advantageous to have both functional entities providing the above described invention incorporated.

Although the invention is described for providing history dumps in an error case, the method allows also for other purposes, i.e. when a user is under surveillance, all information related to the calls may be dumped by simply instructing an entity to tag certain messages as being issued due to an error.

For example, if the Media Gateway Controller would tag each SUB command of a specific user with a Signal Descriptor, all information of the calls of this user could be stored.

Figure 3:
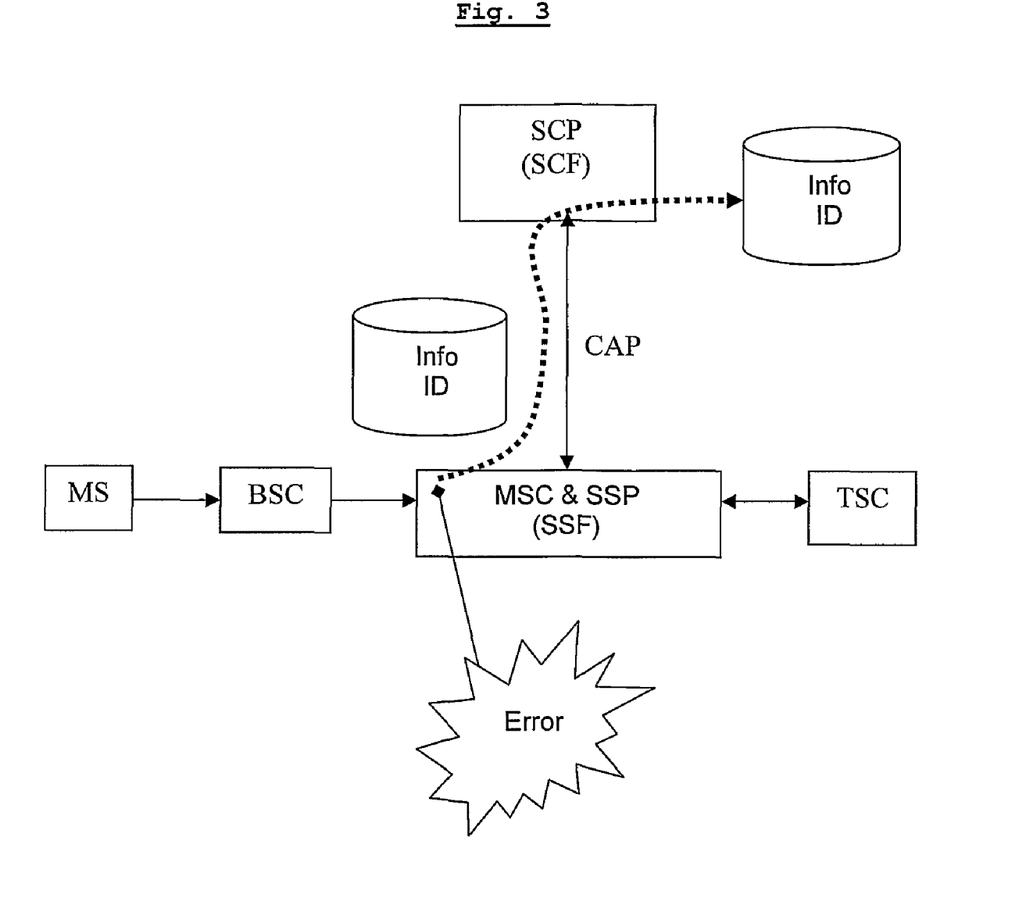
FIG. 3 shows a schematic view of devices of an Intelligent Network set-up incorporating the invention.

Although the invention so far is described in terms of a layered architecture, it is understood that also other functional entities such as a Service Switching Function (SSF) in a Service Switching Point (SSP) and a Service Control Function (SCF) in a Service Control Point (SCP) as depicted in FIG. 3 of an intelligent network (IN) may provide comparable functionality as described above.

In the later case, the communication means would exchange their messages by means of an INAP or Camel Application Part protocol.

It should be noted, that the invention although explained by means of a layered architecture and an intelligent networks, may be employed in comparable set-ups of a distributed environment of a telecommunication system without departing from the scope of the invention.

LIST OF ABBREVIATIONS

CN Core Network
MGC Media Gateway Controller
MGW Media Gateway
F.E. Functional Entity
MS Mobile Station
BSC Base Station Controller
MSC Mobile Switching Center
TSC Transit Switching Center
SCP Service Control Point
SCF Service Control Function
SSP Service Switching Point
SSF Service Switching Function
CAP Camel Application Part

The invention claimed is:

1. A method for providing dumps in a first functional entity of a distributed environment of a telecommunication network, whereby the first functional entity communicates with a second functional entity, whereby during a call set-up procedure a unique identification is exchanged between the first and the second functional entity the method comprising the steps of:
   detecting an error;
   dumping information related to the call and associating the unique identification;
   generating a message comprising a signal descriptor indicating that the message is generated in response to the detected error;
   sending the message to the second functional entity to provoke a dump of information related to the call and associating the unique identification previously exchanged during said call set-up procedure.

2. The method according claim 1, wherein the first and second functional entities communicate according to a Megaco, Gateway Control Protocol (GCP) or H.248 protocol.

3. The method according to claim 1, wherein the unique identification is exchanged in an ADD command.

4. The method according to claim 1, wherein the message comprising a signal descriptor is a SUB command.

5. The method according to claim 1, wherein the first functional entity is a Media Gateway Controller and wherein the second functional entity is a Media Gateway.

6. The method according to claim 1, wherein the first and second functional entities communicate according to an Intelligent Network Application Part (INAP) or Customized Applications for Mobile Networks Enhanced Logic (Camel) Application Part protocol.

7. The method according to claim 1, wherein the first functional entity is a service switching function and the second functional entity is a service control function.

8. A method for providing dumps in a second functional entity of a distributed environment of a telecommunication network, whereby the second functional entity communicates with a first functional entity, whereby during a call setup procedure a unique identification is exchanged between the first and the second functional entites, the method comprising the steps of:
   receiving an event descriptor having an assigned event to be reported when an error occurs;
   detecting an error;
   dumping information related to the call and associating the unique identification;
   generating a message comprising the assigned event according to the event descriptor indicating that the message is generated in response to the detected error;
   sending the message to the first functional entity to provoke a dump of information related to the call and associating the unique identification previously exchanged during said call set-up procedure.

9. The method according to claim 8, wherein the first and second functional entities communicate according to a Megaco, Gateway Control Protocol (GCP) or H.248 protocol.

10. The method according to claim 8, wherein the unique identification is exchanged in an ADD command.

11. The method according to claim 8, wherein the message comprising the assigned event is a NOTIFY command.

12. The method according to claim 8 wherein the second functional entity is a Media Gateway and wherein the first functional entity is a Media Gateway Controller.

13. The method according to claim 8, wherein the first and second functional entities communicate according to an Intelligent Network Application Part (INAP) or Customized Applications for Mobile Networks Enhanced Logic (Camel) Application Part protocol.

14. The method according to claim 8, wherein the first functional entity is a service switching function and the second functional entity is a service control function.

15. A First Device of a distributed environment of a telecommunication network providing dumps, the first device comprising:
   communication means for exchanging messages between the first device and a second device
   said communication means for exchanging, during a call set-up procedure, a unique identification between the first and the second device;
   means for detecting an error;
   means for dumping information related to the call and means for associating the unique identification thereto; and
   means for generating a message comprising a signal descriptor indicating that the message is generated in response to the detected error, said communication means including means for sending said generated message to the second device to provoke a dump of information related to the call and associating the unique identification previously exchanged during said call set-up procedure.

16. The first Device according to claim 15, wherein the Device is a Media Gateway Controller (MGC).

17. The first Device according to claim 15, wherein the Device is a service switching point (SSP).

18. A Second Device of a distributed environment of a telecommunication network providing dumps, the second device comprising:
   communication means for exchanging messages between the second device and a first device and for exchanging during a call set-up procedure a unique identification between the first and the second device;
   means for detecting an error;
   means for dumping information related to the call and means for associating the unique identification thereto; and
   means for generating a message comprising the assigned event according to the event descriptor indicating that the message is generated in response to the detected error; said communication means including means for sending said generated message to the first device to provoke a dump of information related to the call and associating the unique identification previously exchanged during said call set-up procedure.

19. The second Device according to claim 18, wherein the Second Device is a Media Gateway.

20. The second Device according to claim 18, wherein the Second Device is a service control point (SCP).

* * * * *

UNITED STATES PATENT AND TRADEMARK OFFICE
CERTIFICATE OF CORRECTION

| | | |
|---|---|---|
| PATENT NO. | : 8,208,367 B2 | Page 1 of 1 |
| APPLICATION NO. | : 12/279090 | |
| DATED | : June 26, 2012 | |
| INVENTOR(S) | : Martin de Nicolas et al. | |

It is certified that error appears in the above-identified patent and that said Letters Patent is hereby corrected as shown below:

On the Face Page, in Field (52), under "U.S. CL.", in Column 1, Line 1,
after "370/216", insert -- 379/9.05; 379/112.02; 379/221 --.

Signed and Sealed this

Thirteenth Day of November, 2012

David J. Kappos
*Director of the United States Patent and Trademark Office*